Figure 1:
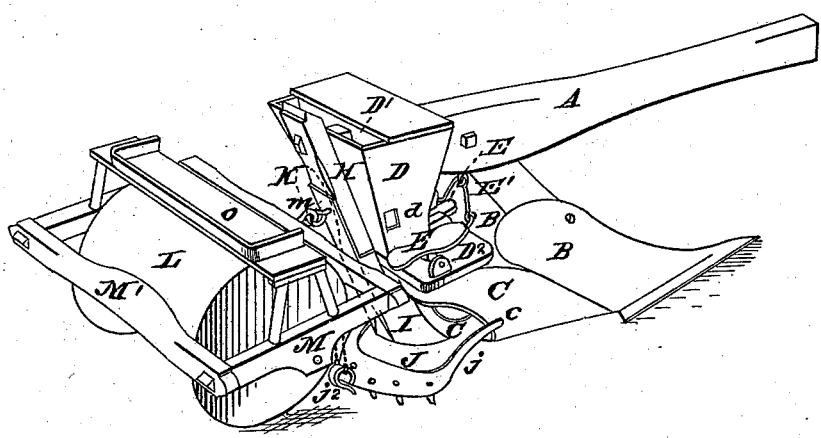

I. H. WALKER.
Combined Plow and Planter.

No. 80,686.            Patented Aug. 4, 1868.

Witnesses:           Inventor:

United States Patent Office.

ISAAC H. WALKER, OF NEWTON, ILLINOIS.

Letters Patent No. 80,686, dated August 4, 1868.

IMPROVEMENT IN COMBINED PLOW AND PLANTER.

The Schedule referred to in these Letters Patent and making part of the same.

TO ALL WHOM IT MAY CONCERN:

Be it known that I, ISAAC H. WALKER, of Newton, in the county of Jasper, and State of Illinois, have invented a new and useful Combined Plow and Planter; and I do hereby declare that the following is a sufficiently full, clear, and exact description thereof, to enable one skilled in the art to which my said invention appertains to make and carry it into effect, reference being had to the accompanying drawings which are made a part of this specification.

The subject of my invention is an implement adapted to break, pulverize, plant, harrow, and roll, at one and the same operation, the several parts of said implement all being of novel and simple construction.

In the drawings—

Figure 1 represents a perspective view of my invention, and

Figure 2:
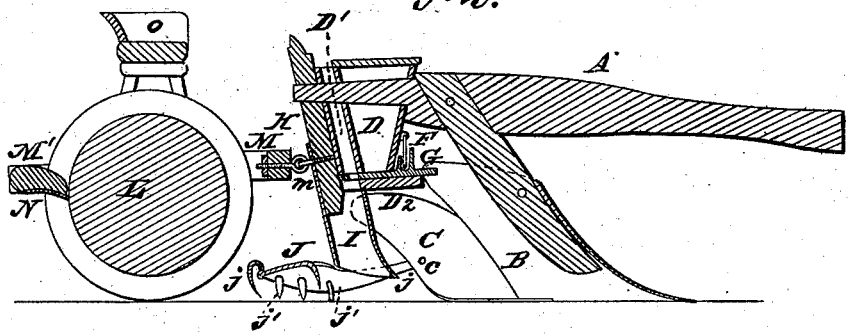

Figure 2 a longitudinal section thereof.

A may represent the beam, and B B the front, and C C the rear mould-boards of the plow.

The beam A is provided with the ordinary clevis at its front end, and the plow B C connected to it, and supported in any suitable manner. The mould-boards and share are in one or more pieces, and of either cast or wrought iron, or steel, of about the form shown, the rear ones, C, extending below the front ones a sufficient distance to take the necessary amount of earth for the planting-ridge out of the bottom of their furrow.

D is the seed-box, which is supported in the rear of the plow, as represented in fig. 2, or in other suitable manner, and which has a separate open compartment, $D^1$, to afford access to the discharge-aperture and spout, to see whether or not the seed is passing through, and to clear said passage of obstructions, it being, if necessary, provided with an aperture, $d$, in its side, to further facilitate this.

The bottom, $D^2$, of these chambers, forms a platform on each side of the box, on which the driver's feet may rest to steady the plow, and which further supports a treadle, E, which is connected by a rod or link, $F'$, and crank-lever F, to the dropping-slide G.

H is a standard, secured to the rear side of the box D, and I a hollow coulter or drill, depending from the lower end of said standard to within a few inches of the lower edge of the plowshare, and communicating at its upper end with the aperture or apertures $e$, through which the seed is dropped.

J represents the harrow. It is made, preferably, of wrought iron, of the form represented, having spring-arms, $j$, terminating in hooks, which engage in perforations, $c$, in the rear lower edges of the mould-boards C. Its body is of concave form, to conform to the form of ridge left by the mould-boards, and is studded in the usual manner with teeth, $j^1$, and provided at its rear end with a hook or staple, $j^2$, for the attachment of a cord or rod, K, by which to raise it.

L is a concave roller, mounted in a suitable frame, M, which is attached to the plow and planter-frame by the swivel or link-joint $m$. The rear bar $M'$ of this frame corresponds in outline with the periphery of the roller L, and has attached to its lower side a scraper, N, to remove the dirt which adheres to said roller.

O is the driver's seat, which is also mounted on the frame M, in a convenient position to enable the driver to easily reach the operating-devices, and preferably, as represented, is mounted directly over the axis of said roller, so that the driver, by throwing the weight of his body on either side of said axis, may depress or elevate the point of the plow, as may be necessary to regulate the depth of furrow.

In operation, the front mould-boards break the soil, throwing aside the upper surface, which contains the seed of the weeds, and leaving a furrow two or more inches deep, and twenty, more or less, inches wide. The rear ones, following, throw up the clear soil from the bottom of the furrow in a ridge about four inches high, which is divided to the depth of about two inches by the dropping-coulter, and the seed deposited in it at that point, the earth being pulverized and compressed in a convex ridge over it by the harrow and roller.

The dropper is operated by pressing, alternately, with the treadle E, the former movement drawing the slide G into the seed-box to be filled with seed, and the latter bringing it in communication with the discharge-aperture.

To enable the planting to be performed regularly, it may be necessary to lay off the ground in one direction before planting, unless the rows of the previous year are sufficiently distinct for the operator to follow. It is, however, obvious that the dropping-slide or its equivalent may receive its motion from the shaft of the roller, or from a wheel travelling on the ground, in which case the distance of the hills would be determined by the revolution of the roller or wheel, and the necessity of marking thus obviated.

The seed thus planted rests on a layer of about two inches of loose, clear soil, and is covered to a like thickness, and has about eight inches on each side of it. The weeds, all being between the rows, may be easily destroyed when they begin to grow, by turning them up with a plow, and thus exposing them to the sun, which soon kills them.

I propose, in some instances, providing the plow with handles, to facilitate guiding it, said handle being secured to it in any suitable manner, and projecting up and back to within convenient reach of the driver's seat. I also propose providing one or both of said handles with a sling, to support the hand or arm of the operator when desired.

Having thus described my invention, the following is what I claim as new, and desire to secure by Letters Patent:

1. I claim the mould-boards C C, projecting rearwardly and inwardly from the front mould-boards B B, at the same or a greater depth, substantially in the manner and for the purpose specified.

2. I claim the combined arrangement of the seed-box D D' d, dropping-slide G, crank-lever F, and treadle E, all constructed and employed substantially as and for the purpose described.

3. I claim the harrow J, constructed as described, and employed in combination with the plows B C and and planter D I, in the manner and for the purpose specified.

4. I claim the combined arrangement of the plows B C, planter D I, harrow J, and roller L, all constructed and operating substantially as and for the purpose described.

5. I claim the hollow coulter or drill I, in combination with the mould-boards C C and planter D, as and for the purpose set forth.

ISAAC H. WALKER.

Witnesses:
 FULLER NIGH,
 JOHN D. WEBB.